United States Patent [19]

Lisec

[11] Patent Number: 4,972,938

[45] Date of Patent: Nov. 27, 1990

[54] APPARATUS FOR THE FILLING OF SPACER FRAMES FOR INSULATING GLASS

[76] Inventor: Peter Lisec, Bahnhofstrasse 34, A-3363 Amstetten-Hausmening, Austria

[21] Appl. No.: 252,135

[22] Filed: Oct. 3, 1988

[30] Foreign Application Priority Data

Oct. 5, 1987 [AT] Austria ................................ 2534/87

[51] Int. Cl.[5] ............................................ B65G 47/34

[52] U.S. Cl. ............................... 198/468.6; 198/486.1

[58] Field of Search ............... 198/468.6, 468.9, 486.1, 198/487.1

[56] References Cited

U.S. PATENT DOCUMENTS 2,918,164 12/1959 Austin et al. ................ 198/468.6 X
3,799,318 3/1974 Dekoekkoek .

FOREIGN PATENT DOCUMENTS 356832 5/1980 Austria .
383580 7/1987 Austria .
383582 7/1987 Austria .
0261471 3/1988 European Pat. Off. .
0192921 5/1988 European Pat. Off. .
1006799 4/1957 Fed. Rep. of Germany .
2712651 3/1978 Fed. Rep. of Germany .
3408677 4/1985 Fed. Rep. of Germany .
3223881 9/1985 Fed. Rep. of Germany .
8707621.7 9/1987 Fed. Rep. of Germany .
8616377.9 12/1987 Fed. Rep. of Germany .
8712174.3 12/1987 Fed. Rep. of Germany .

*Primary Examiner*—Joseph E. Valenza
*Assistant Examiner*—D. Glenn Dayoan
*Attorney, Agent, or Firm*—Young & Thompson

[57] ABSTRACT

In an apparatus for filling spacer frames for insulating glass with a hygroscopic material, a lateral support (1) is provided for the spacer frames, as well as an apparatus (1) for rotating the spacer frames by 90°, two charging stations (2, 3) for filling the spacer frames with a hygroscopic material wherein the charging heads (13, 14) are arranged at the top rim of the lateral support (11). Furthermore, a linear conveyor (17) extending through the apparatus along the bottom rim of the lateral support (11) is provided for the spacer frames. In order to lift the spacer frames into the region of the charging heads (13, 14), sections (18) of the linear conveyor (17), located in the region of the charging stations (2, 3), can be raised along the lateral support (11). Finally, a station (5) is provided for transferring the filled spacer frames to a suspension conveyor (6) which latter moves the spacer frames preferably transversely to the lateral support.

2 Claims, 2 Drawing Sheets

APPARATUS FOR THE FILLING OF SPACER FRAMES FOR INSULATING GLASS

BACKGROUND OF THE INVENTION

The invention relates to an apparatus for the conveyance of spacer frames for insulating glass from a first linear conveyor extending along the bottom rim of a lateral support for the spacer frames to a second linear conveyor for spacer frames extending in parallel to the first linear conveyor along the bottom rim of a lateral support for the spacer frames, the lateral supports being preferably constituted by a substantially continuous slide wall, with a suspension conveyor, moving preferably transversely to the lateral supports, for the spacer frames, several pairs of hooks being provided at this suspension conveyor.

Devices for the manufacture of insulating glass are frequently subdivided into two mutually opposed sections for space reasons. Devices of the type mentioned hereinabove are utilized for transporting spacer frames from one section of such a device to the oppositely located section.

SUMMARY OF THE INVENTION

The invention is based on the object of improving, in an apparatus of the type set forth above, the transfer of the spacer frames to the suspension conveyor, and the taking off of the spacer frames from the latter.

This has been achieved according to the invention by providing a device for transferring spacer frames to the suspension conveyor comprising at least two carriers in the lateral support, projecting beyond the latter in the forward direction and being liftable in the upward direction, for raising the spacer frames along the lateral support up to the level of the suspension conveyor, and a slide that can be reciprocated transversely to the lateral support, this slide seizing, in one of its end positions, a spacer frame suspended on the carriers and being associated, in its other end position, with a pair of hooks of the suspension conveyor; and by providing that, on the delivery side of the suspension conveyor, in the lateral support of the second linear conveyor, carriers projecting beyond the support are displaceable up to the second linear conveyor for lowering a spacer frame; and that, after each stroke of the suspension conveyor, a pair of hooks thereof is located behind the lateral support.

The invention is useful, inter alia, on an apparatus for filling spacer frames for insulating glass, preferably spacer frames bent in one piece, with a hygroscopic material.

Such an apparatus has been known from Austrian No. B-383,582. The conventional apparatus comprises two charging heads, each of which has a drill for producing an opening in a leg of the spacer frame, a means for charging hygroscopic material (e.g. a molecular sieve) into the interior of the spacer frame, and a device for sealing the previously formed opening, preferably fashioned as a means forcing a plug of a plastic and hardening sealing compound into the opening. In the conventional apparatus, the spacer frames, prior to being worked on in the filling apparatus, are ordinarily hung into the latter manually on hooks arranged above the two charging heads.

The invention is furthermore based on the objective of further developing the apparatus known from Austrian No. B-383,582 in the direction toward rendering the feeding and discharging of the spacer frames to be treated extensively automatic.

In attaining this object, such an apparatus is characterized by a lateral support for the spacer frames constituted preferably by a substantially continuous slide wall, by an apparatus for rotating the spacer frames by 90°, by at least one charging station, preferably two charging stations, for filling the spacer frames with a hygroscopic material wherein the charging heads are arranged at the upper rim of the lateral support, by a device for moving the spacer frames into the zone of the charging heads, by a linear conveyor for the spacer frames extending through the apparatus along the bottom rim of the lateral support.

In the apparatus of this invention, located with special advantage subsequently to a station for the bending of hollow profiled strips into spacer frames for insulating glass and to a device for the butt welding of the two free ends of the hollow profiled strips bent into a spacer frame, which device follows the station, the spacer frames are guided by the lateral support, transported to the charging heads and thereafter, following an additional linear transport step, passed on to further processing. This further processing can be, for example, the coating of spacer frames with sealant or adhesive (e.g. butyl rubber), as known from Austrian No. B-356,832.

BRIEF DESCRIPTION OF THE DRAWINGS

Additional features and details of the apparatus can be seen from the dependent claims, as well as from the following description of the embodiment illustrated in the drawings wherein:

DETAILED DESCRIPTION OF THE PREFERRED EMBODIMENT

Figure 1:
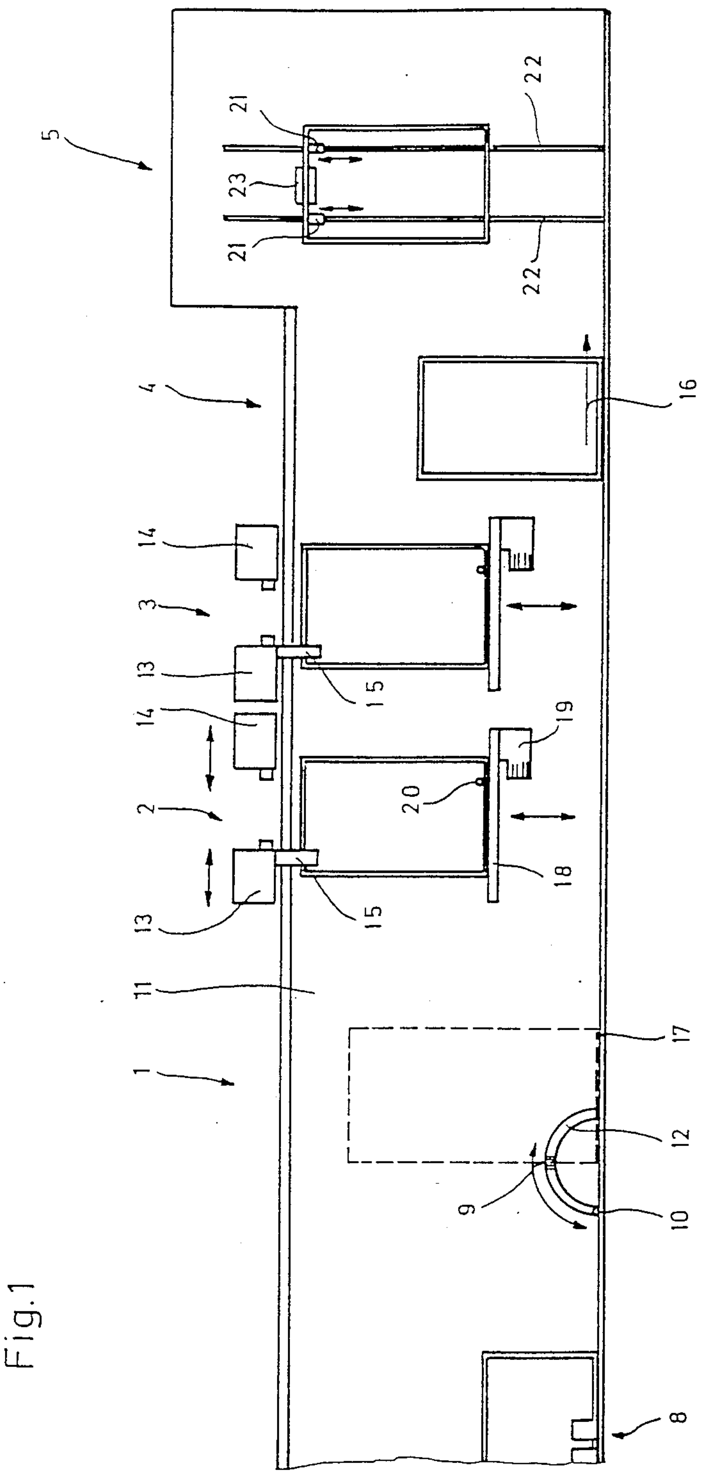
FIG. 1 shows an apparatus for filling spacer frames for insulating glass, in an elevational view.

An apparatus illustrated in FIG. 1 for the filling of spacer frames of insulating glass with a hygroscopic material (e.g. a molecular sieve), as illustrated in FIG. 1, comprises several apparatus parts. Thus, a device 1 is provided for rotating the spacer frames by 90°. Following this device, two charging stations 2 and 3 are arranged in the apparatus wherein the spacer frames are filled with the hygroscopic material. Downstream of the second charging station 3, a section 4 is provided wherein the spacer frames are conveyed linearly to a device 5 wherein they are transferred to a horizontal suspension conveyor 6. The horizontal conveyor 6 transports the spacer frames to a device 7 wherein the spacer strips are taken off the suspension conveyor 6.

It can furthermore be seen from FIG. 1 that the apparatus according to the invention includes a welding station 8 located in front of the turning device 1, based on the working direction, wherein the free ends of the hollow profiled strips, bent into a spacer frame, for example, in a bending unit known from German No. C-3,223,881, are butt-welded together. Such a welding unit is known, for example, from EP-A-192,921.

The turning station 1 comprises a rotating gripper exhibiting respectively one pair of clamps 9 and 10 at two arms arranged mutually perpendicularly. The clamp pairs 9 and 10 of the rotating gripper seize two mutually perpendicularly oriented legs of the spacer strip and retain same during the rotating motion of the rotating gripper. The clamping jaws can be swung from a readiness position wherein they extend in parallel to a supporting wall 11 provided in the apparatus and serving as a lateral support and are located behind this wall, into an operative position wherein they contact from both sides the frame legs of the spacer strip to be seized and project forwardly through a circular-arc-shaped slot 12 arranged in the supporting wall 11. Such a turning gripper has been known in principle from Austrian No. B-356,832. The rotating of the spacer frames by 90° serves the purpose of orienting the spacer frames, which latter are aligned in the welding station 8 (by the preceding bending apparatus) in such a manner that their longer legs are directed horizontally, in such a way with respect to the linear conveyor 17 that the longer legs extend vertically.

Each of the two charging stations 2 and 3 comprises two charging heads 13 and 14 which can have the structure known from Austrian B-383,582. Each charging head includes a clamp for retaining the spacer frames during the charging step, a drill for producing an opening in a leg of the spacer frame, preferably in a leg oriented during the filling step essentially perpendicularly, a nozzle from which the hygroscopic material is introduced into the interior of the spacer frame, and an apparatus for sealing the previously produced openings in the spacer frame.

As indicated by arrows in FIG. 1, the charging heads 13 and 14 of the charging stations 2 and 3 are displaceable along the top rim of the supporting wall 11 so that they can be oriented to lie in opposition to the vertical legs of the spacer frames to be filled.

Downwardly pointing guide means 15 for the upper section of the spacer frame to be filled are provided at a spacing in front of the front side of the supporting wall 11 at the charging heads 13 of charging stations 2 and 3.

In order to lift the spacer frames advancing on a linear conveyor 17 along the bottom rim of the supporting wall 11 in the direction of arrow 16, the sections of the linear conveyor 17 provided below the charging stations 2 and 3 are fashioned as liftable conveyor track portions 18.

The conveyor track sections 18 are designed as endless belt conveyors and can be raised, together with their drive motor 19, by means that are not shown in detail. In order to retain the spacer frames on the conveyor track sections 18 during the lifting step, clamps 20 are furthermore associated with these sections, forcing the lower horizontal leg of the spacer frames against the conveyor track sections 18. The clamps 20 can be swung upwards behind the supporting wall 11 during the feeding and discharging of the spacer frames.

The device 5 for transferring filled spacer frames to the suspension conveyor 6 comprises two lifting cams 21 that can be raised in slots 22 of the supporting wall 11. In this arrangement, the lifting cams 21 are guided so that they are located, in their lower readiness position, underneath and/or behind the supporting wall 11 so that they do not interfere with the feeding of spacer frames.

Furthermore, a slide 23 is provided in station 5; this slide is located between the slots 22 and can be reciprocated in the direction of double arrow 24. The slide 23 is of a substantially hook-shaped design and takes over, with its horizontal support 25, a spacer frame lifted by the lifting cams 21, shifting this spacer frame onto a pair of hooks 26 of the suspension conveyor 6. In order to simplify insertion of the spacer frames in the hooks 26 of the suspension conveyor 6, these hooks are equipped with a slant 27. After the spacer frames have been transferred by the slide 23, the spacer frames are suspended in a hollow 28 of the hooks 26. As soon as a spacer frame has been hung into a hook pair 26 of the suspension conveyor 6, the latter moves on by one step in the direction of arrow 29, and the slide 23 moves backwards so that the next pair of hooks is ready to take over the subsequent spacer frame from the slide 23.

Figures 2, 3:
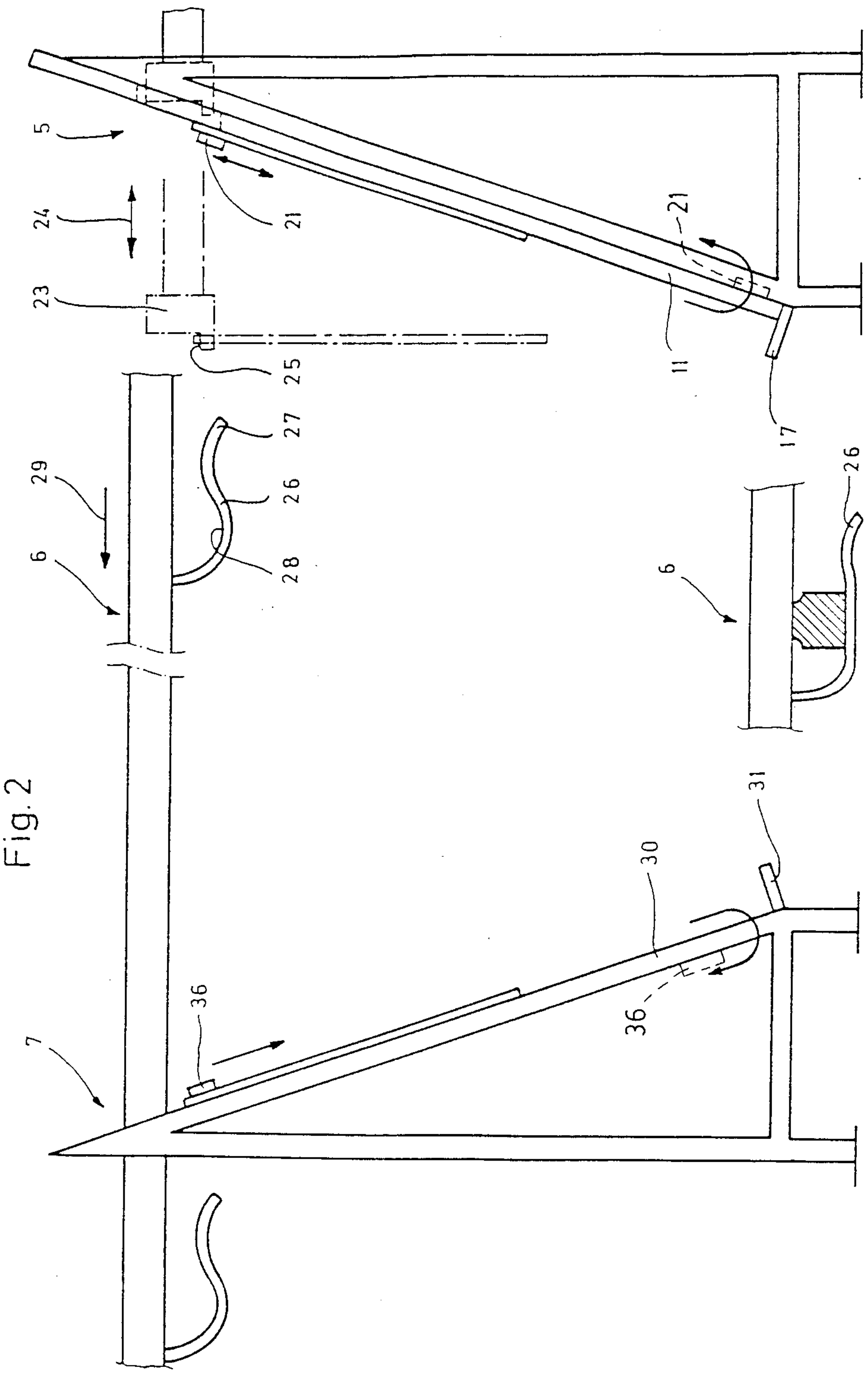
FIG. 2 shows in a lateral view the device for transferring the spacer frames to a suspension conveyor, as well as a device for removing the spacer frames therefrom (not drawn to scale)
FIG. 3 shows a detail of the suspension conveyor.

It is further to be noted that the hooks 26 in FIG. 2 are illustrated disproportionately large in order to better illustrate their structure.

The hooks 26 are preferably designed so that they resiliently clamp the upper, horizontal leg of the spacer frames, arranged in the hooks 26, with a horizontal and straight section (cf. FIG. 3) so that pendulating motions of the spacer frames are damped and/or suppressed.

On the delivery side of the suspension conveyor 6, a supporting wall 30 is likewise provided, a linear conveyor 31 being located at the bottom end of this wall. The length of one step (stroke) of the suspension conveyor 6 is dimensioned so that in each case a pair of hooks 26, after execution of the step, is located behind the supporting wall 30, so that the spacer frames are pulled off from a hook pair 26 and rest with their upper horizontal leg on a pair of lifting cams 36. After this has occurred, the lifting cams 36 are moved downwardly until they have been moved underneath and/or behind the supporting wall 30, as indicated, for example, by the curved arrow in FIG. 2. The spacer frame now rests on the linear conveyor 31 while being supported on the supporting wall 30 and can be passed on to further processing, e.g. coating with sealing compound or adhesive.

What is claimed is:

1. Apparatus for conveying spacer frames for insulating glass, comprising a first lateral support for the spacer frames, a first linear conveyor extending along a lower portion of said first lateral support, a second lateral support for the spacer frames, a second linear conveyor for the spacer frames extending along a lower portion of said second lateral support parallel to said first linear conveyor, a suspension conveyor for the spacer frames, said suspension conveyor extending between said lateral supports and carrying hooks for supporting said spacer frames, first carrier means movable along said first lateral support for raising spacer frames from said first linear conveyor to the level of said suspension conveyor, a slide reciprocable relative to and between said first carrier means and said suspension conveyor for transferring spacer frames from said first carrier means to said suspension conveyor, and second carrier means movable along said second lateral support for receiving spacer frames from said suspension conveyor and for moving said spacer frames downwardly along said second lateral support to said second linear conveyor, each of said lateral supports having support surfaces lying in a plane, each of said carrier means being movable in one direction on one side of said plane of its associated said lateral support for raising or lowering said spacer frames and being movable in the opposite direction on the other side of said plane of said associated lateral support for return movement of said carrier means.

2. Apparatus according to claim 1, in which the hooks of the suspension conveyor open toward said first lateral support and have an upwardly inclined end surface that terminates in a direction away from said first lateral support in a hollow for receiving a said spacer frame.

* * * * *